(12) United States Patent
Demiar et al.

(10) Patent No.: US 11,878,490 B2
(45) Date of Patent: Jan. 23, 2024

(54) CARBON NANOTUBES IN CARRIER TAPE, COVER TAPE AND STATIC SHIELDING BAGS

(71) Applicant: Advantek, LLC., St. Louis, MO (US)

(72) Inventors: Melvin Demiar, Mondovi, WI (US); Bill Simons, Jim Falls, WI (US)

(73) Assignee: Advantek, LLC., St. Louis, MO (US)

( * ) Notice: Subject to any disclaimer, the term of this patent is extended or adjusted under 35 U.S.C. 154(b) by 298 days.

(21) Appl. No.: 17/549,150

(22) Filed: Dec. 13, 2021

(65) Prior Publication Data

US 2022/0106096 A1 Apr. 7, 2022

Related U.S. Application Data

(63) Continuation of application No. 16/449,633, filed on Jun. 24, 2019, now abandoned.

(Continued)

(51) Int. Cl.
 *B32B 15/085* (2006.01)
 *B32B 27/08* (2006.01)
(Continued)

(52) U.S. Cl.
 CPC ........... *B32B 15/085* (2013.01); *B32B 3/12* (2013.01); *B32B 27/08* (2013.01); *B32B 27/308* (2013.01);
(Continued)

(58) Field of Classification Search
 CPC ........ B32B 15/085; B32B 3/12; B32B 27/08; B32B 27/308; B32B 7/12; B32B 27/18;
(Continued)

(56) References Cited

U.S. PATENT DOCUMENTS

2008/0085405 A1 4/2008 Prenzel et al.
2013/0209748 A1 8/2013 Fujiwara et al.
(Continued)

FOREIGN PATENT DOCUMENTS

CN 101321426 A 12/2008
CN 101321426 A 2/2013
(Continued)

OTHER PUBLICATIONS

M H Andrew Ng, Lysia T Hartadi, Huiwen Tan and C H Patrick Poa, "Efficient coating of transparent and conductive carbon nanotube thin films on plastic substrates", Published Apr. 15, 2008 • IOP Publishing Ltd., Nanotechnology, vol. 19, No. 20.

*Primary Examiner* — James C Yager
(74) *Attorney, Agent, or Firm* — Edwin E. Voigt, II

(57) ABSTRACT

A carrier tape, cover tape or static shielding bag for transportation of electronic components is constructed of polymers and carbon nanotubes being between 0.01% and 3% by weight. The carbon nanotubes may have any number of walls and any desired size of diameter dimension which is less than approximately 100 nm. The carrier tape, cover tape or bags including the carbon nanotubes have a static dissipative range measured between $1\times10^5$ and $1\times10^{12}$ Ω/sq and a light transmittance value of between 60% and 90%. The carrier tape, cover tape or bags including the carbon nanotubes reduce surface defects, high density entanglements and agglomerations. The static shielding bags including the carbon nanotubes may be formed as sheets which are manufactured into a desired size of bag.

14 Claims, 1 Drawing Sheet

Related U.S. Application Data

(60) Provisional application No. 62/733,746, filed on Sep. 20, 2018, provisional application No. 62/697,075, filed on Jul. 12, 2018.

(51) Int. Cl.

| | | |
|---|---|---|
| *B65D 85/00* | (2006.01) | |
| *C08K 3/04* | (2006.01) | |
| *B32B 27/30* | (2006.01) | |
| *B32B 3/12* | (2006.01) | |
| *B65D 73/02* | (2006.01) | |
| *B32B 7/12* | (2006.01) | |
| *B32B 27/18* | (2006.01) | |
| *B32B 27/36* | (2006.01) | |
| *B32B 27/32* | (2006.01) | |

(52) U.S. Cl.
CPC ............... *B65D 85/70* (2013.01); *C08K 3/04* (2013.01); *B32B 7/12* (2013.01); *B32B 27/18* (2013.01); *B32B 27/302* (2013.01); *B32B 27/32* (2013.01); *B32B 27/36* (2013.01); *B32B 27/365* (2013.01); *B32B 2264/108* (2013.01); *B32B 2307/21* (2013.01); *B32B 2307/31* (2013.01); *B32B 2307/72* (2013.01); *B32B 2405/00* (2013.01); *B32B 2439/40* (2013.01); *B32B 2439/46* (2013.01); *B32B 2457/00* (2013.01); *B65D 73/02* (2013.01); *B65D 2585/86* (2013.01); *C08K 3/041* (2017.05); *C08K 2201/006* (2013.01); *Y10T 428/13* (2015.01); *Y10T 428/1334* (2015.01); *Y10T 428/1352* (2015.01)

(58) Field of Classification Search
CPC ....... B32B 27/302; B32B 27/32; B32B 27/36; B32B 27/365; B32B 2264/108; B32B 2307/21; B32B 2307/31; B32B 2307/72; B32B 2405/00; B32B 2439/40; B32B 2439/46; B32B 2457/00; B32B 2250/03; B32B 15/09; B32B 2250/05; B32B 2270/00; B32B 2307/20; B32B 2307/40; B32B 2307/412; B32B 2307/414; B32B 2307/518; B32B 2307/714; B32B 2553/00; B32B 2571/00; B32B 15/082; B32B 15/095; B32B 2307/41; B32B 2433/02; B65D 85/70; B65D 73/02; B65D 2585/86; C08K 3/04; C08K 3/041; C08K 2201/006; C08K 2201/003; C08K 2201/011; Y10T 428/13; Y10T 428/1334; Y10T 428/1352; C09J 2301/408; C09J 2301/41; C09J 7/22; C09J 7/30; C08L 23/0815; C08L 25/12; C08L 55/02; C08L 69/00; C08L 67/02

See application file for complete search history.

(56) References Cited

U.S. PATENT DOCUMENTS

| | | |
|---|---|---|
| 2014/0170414 A1 | 6/2014 | Zang et al. |
| 2014/0356579 A1 | 12/2014 | Shin et al. |

FOREIGN PATENT DOCUMENTS

| | | |
|---|---|---|
| CN | 103404249 A | 11/2013 |
| CN | 103404249 A | 11/2013 |
| CN | 104212143 A | 12/2014 |
| CN | 104212143 A | 12/2014 |
| JP | 2007039567 A | 2/2007 |
| JP | 2017-095525 A | 6/2017 |
| JP | 2017095525 A | 6/2017 |
| JP | 2018-103586 A | 7/2018 |
| JP | 2018103586 A | 7/2018 |
| WO | 2008/154231 A2 | 12/2008 |
| WO | 2012046806 | 4/2012 |

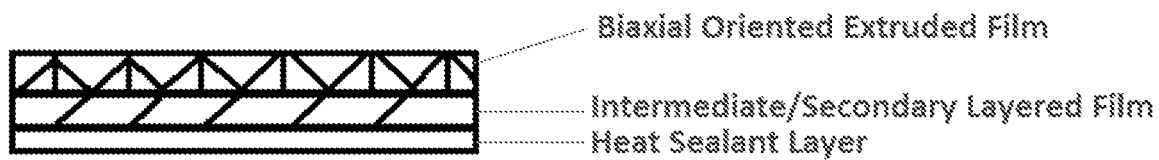

CARBON NANOTUBES IN CARRIER TAPE, COVER TAPE AND STATIC SHIELDING BAGS

CROSS-REFERENCE TO RELATED APPLICATIONS

This application is a continuation of and claims the benefit to pending U.S. patent application Ser. No. 16/449,633 filed Jun. 24, 2019, which is incorporated by reference herein in its entirety. This application claims the benefit of U.S. Provisional Patent Application Ser. No. 62/697,075 filed Jul. 12, 2018, which is incorporated by reference herein in its entirety. This application also claims the benefit of U.S. Provisional Patent Application Ser. No. 62/733,746 filed Sep. 20, 2018, which is incorporated by reference herein in its entirety.

FIELD OF THE INVENTION

The present invention in general relates to anti-static packaging for electronic components transported in carrier tape as enclosed by cover tape and anti-static bags, where the anti-static packaging is at least partially formed of carbon nanotubes. The inclusion of carbon nanotubes in the anti-static packaging improves the static dissipation and conduction for the packaging products.

BACKGROUND

Currently carbon black is used in carrier tape as an additive to either the full homogenous thickness, or as part of a separate top and bottom cap layer, in order to increase the conductivity of the normally insulated material used to form the carrier tape. The use of the carbon black material assists in the reduction of static build-up along the carrier tape during the transportation of electronic components. Static build-up may discharge, resulting in damage to, or the destruction of, sensitive electronic components, which are placed into and are being transported within the carrier tape pockets and/or anti-static bags.

Carrier tape may be produced from extruded stock materials which in turn may be reheated and formed, or may be formed immediately after extrusion, into the carrier tape, cover tape or anti-static bags in a continuous process.

Currently static shielding bags are formed of multiple layers which are laminated together with at least one foil or metalized film layer between the outer layers. The at least one foil or metalized film layer provides an electrically conductive pathway which is used to divert or to dissipate electricity or static electricity away from the contents of the bag, in order to protect electrically sensitive products transported within the interior of the bag. The dissipation of static electricity reduces a static charge which may damage or destroy sensitive electronic components being transported in the static shield bags.

The number of layers in a static shield bag typically range from three to five. One or more of the layers may consist of materials having different characteristics such as static shielding, moisture barriers, or puncture resistance. Individual layers within a static shield bag generally range in thickness from 0.0005 inches to 0.003 inches and an overall bag thickness of 0.002 inches to 0.008 inches. A typical 3-layer bag may utilize a static dissipative polyester outer layer, a foil shield in the center and a static dissipative polyethylene inner layer. Additional layers may include nylon or other polymers to add strength, moisture barrier qualities or additional static shielding. A 5-layer bag could include two aluminum foil shields separated by a polyester layer in the center instead of a single foil shield.

Moisture barrier protection may be provided within the static shielding bag when various materials are laminated together to form the bag material.

A common configuration of cover tape includes three (3) layers as may be seen in FIG. 1. The first layer is typically composed of biaxial oriented film that provides rigidity to the cover tape. The first layer may be formed of polyester such as polyethylene terephthalate (PET/BO-PET). The second layer or intermediary material will bond the first layer through the use of a sealant layer which may be formed of polyethylene (PE), polypropylene (PP), and ethylene-vinyl acetate copolymer (EVA). It should be noted that other polymers/compounds may used. The sealant which is the $3^{rd}$ material may vary depending on the material that is being used in the intermediary material. The $3^{rd}$ material is usually formed of two or more common sealant polymer components including but not limited to ethylene-vinyl acetate copolymer (EVA), polyurethane-based resins (PU), polyethylene resins (PE), polyvinyl chloride (PVC) etc.

Current cover tapes generally uses π-electro conjugated conductive polymers including but not limited to poly (3.4-ethylenedioxythiophene/polystyrene sulfonic acid (PEDOT/PSS), poly (3-propyl-thiophene), poly (3-ethyl pyrrole); fine powders with electrical conductivity capabilities such as titanium oxide, zinc oxide, tin oxide, carbon black or a combination thereof, The conjugated conductive polymers may be an additive to the base film layer to increase the conductivity of the film layer. In use with cover tape, this layer is coated with heat activated adhesive which blocks the film layer and prevents static control on the device side of the cover tape.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. § 1.56(a) exists.

All U.S. patents and applications and all other published documents mentioned anywhere in this application are incorporated herein by reference in their entirety.

Without limiting the scope of the invention, a brief description of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided for the purposes of complying with 37 C.F.R. § 1.72.

BRIEF DESCRIPTION OF THE DRAWINGS

FIG. 1 is a prior art configuration of cover tape including three (3) layers.

GENERAL DESCRIPTION OF THE INVENTION

In one embodiment, a carrier tape includes a plurality of aligned pockets, where the tape and pockets transport electronic components and the carrier tape is formed of polymers having a weight percentage of between 0.99% and 99% and carbon nanotubes, the carbon nanotubes having a weight percentage of between 0.01% and 3%.

In another embodiment, the carbon nanotubes are selected from the group consisting of single walled carbon nanotubes, double walled carbon nanotubes, and three or more walled carbon nanotubes and combinations thereof.

In another alternative embodiment, the double walled carbon nanotubes and three or more walled carbon nanotubes have a wall separation distance between adjacent walls of between 0.20 nm and 0.34 nm.

In at least one embodiment, the carbon nanotubes each have a diameter dimension of between 1 nm and 100 nm.

In some embodiments, the carbon nanotubes each have a surface area of between 600 $m^2/g$ to 1000 $m^2/g$.

In at least one alternative embodiment, the carbon nanotubes used in the carrier tape, cover tape or static dissipative bags have an aspect ratio of 3000:1 to 6000:1 length to diameter ratio.

In some alternative embodiments the carbon nanotubes are added to the polymers as raw carbon nanotube material prior to extrusion of the carrier tape or during the formation of sheets used in the manufacture of the static dissipative bags.

In at least one alternative embodiment, the polymers are selected from the group consisting of polycarbonate (PC), acrylonitrile butadiene styrene (ABS), polypropylene (PP), polystyrene (PS), Polyethylene Terephthalate (PET), High Density Polyethylene (HDPE), Low Density Polyethylene (LDPE), Linear Low Density Polyethylene (LLDPE), Styrene-Acrylonitrile (SAN), Polyethylene (PE), Polyester (PETE) and combinations thereof.

In at least one alternative embodiment, the carrier tape, cover tape or static dissipative bags including carbon nanotubes have a static dissipative range measured between $1 \times 10^5$ and $1 \times 10^{12}$ Ω/sq.

In some embodiments, the carrier tape, cover tape or static dissipative bags having carbon nanotubes have a light transmittance values of between 60% and 90%, a haze value of between 60% and 70% and/or a clarity value of between 25% and 45%.

In some embodiments, the carrier tape, cover tape and/or static dissipative bags including carbon nanotubes reduce surface defects, reduce high density entanglements and/or reduce agglomerations during the manufacturing process.

In at least one embodiment, the carrier tape, cover tape and/or static dissipative bags including carbon nanotubes reduce carbon material transfer.

In at least one alternative embodiment, the carrier tape includes a cover tape, the cover tape having a heat activated adhesive or pressure sensitive adhesive, the cover tape being formed of at least one layer, the at least one layer being including polymers and carbon nanotubes.

Utilizing carbon nanotubes in the heat activated adhesive layer will allow improved static control inside the carrier tape pockets. This helps to reduce static build-up which can damage or destroy sensitive electronic components that are placed and transported in the carrier tape pockets. Carbon nanotubes can also be used to control the surface resistivity of the base film layer and maintain a transparent material.

The cover tape includes carbon nanotubes (CNT) either dispersed throughout the heat activated adhesive coating, or in the base polymer film. In both cases, the surface resistivity of the base film and adhesive coating can be controlled and prevent static discharge and damage to electrostatically sensitive devices sealed into carrier tape pockets with the cover tape. Carbon nanotubes provide consistent and repeatable surface resistivity (SR) readings and are less affected by the heating and forming cycles. Small amounts of the CNT's are added to the base material, leaving the finished product transparent. A translucent to clear material has advantages of being able to see the device in the pocket during the loading, transport and pick & place operations.

CNT's have a high aspect ratio, requiring minimal loading and allowing a consistent level of control of surface resistivity. Carbon nanotubes include both single wall and multi-wall carbon nanotubes that can be utilized as a conductive additive to cover tape adhesives and backing film tape.

CNT's may be incorporated within, but are not limited to various polymers such as polyester and polyolefins which are common for cover tapes.

Creating coated product using CNT's may be accomplished by adding the carbon nanotubes in to the coating mixture in a raw form and dispersed through mixing and application. Carbon nanotubes may be mixed in at various ratios dependent on the percentage of CNT's in the master batch, which is based on the final surface resistivity level being targeted for the cover tape heat activated adhesive.

For the film, it is also possible to pre-mix the CNT's into a final resin which may be fed directly into the extruder, or the carbon nanotubes may be added using a carrier material that is compatible with the base film and mixed together with the base resin prior to extrusion.

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

DETAILED DESCRIPTION OF THE PREFERRED EMBODIMENTS

In some embodiments, the carbon nanotubes included in the carrier tape invention disclosed herein, utilize carbon nanotubes (CNT) either dispersed throughout the carrier tape in a homogenous extruded material, or as cap layers on a multi-layer extruded material. Carbon nanotubes provide more consistent and repeatable surface resistivity (SR) readings. Static Dissipative materials utilizing carbon nanotubes have surface resistivity readings in the range of $1 \times 10^5$ to $1 \times 10^{12}$ Ω/sq. This level of surface resistivity reduces the likelihood of damage to components from static discharge. Using carbon nanotubes in combination with polymers allows for targeting and controlling SR readings to smaller ranges (3 decades or 10^3 in a Decade Scale) as compared to carbon black having a higher SR reading (6 decades in a Decade Scale). Products made with carbon nanotubes are less affected by the heating and forming cycles used during the formation of the carrier tape, since the smaller particle sizes associated with carbon nanotubes allows for better material dispersion and more consistent change of density when stretched.

In certain embodiments, common carbon nanotubes exist in single, double and multiwall variations with a ~0.34 nm adjacent separation for each wall in a multiwall variation. The diameters for the carbon nanotubes range from approximately 1 nm to approximately 100 nm in diameter.

In other embodiments, smaller amounts of the carbon nanotubes, usually less than or equal to approximately 3%, are used to obtain an acceptable static dissipative range, with sizes for the carbon nanotubes ranging from 1 nm to 100 nm.

The carbon nanotubes having the size ranges as disclosed are added to the base material as compared to the addition of approximately 10-15% addition of carbon black to the base material to provide a comparable surface resistivity for the manufactured product.

In at least one embodiment, carbon nanotubes may be incorporated within base materials formed of various polymers such as polycarbonate (PC), acrylonitrile butadiene styrene (ABS), polypropylene (PP), and polystyrene (PS), Polyethylene Terephthalate (PET), High Density Polyethylene (HDPE), Low Density Polyethylene (LDPE) and Linear Low Density Polyethylene (LLDPE), Styrene-Acrylonitrile (SAN), Polyethylene (PE), or Polyester (PETE) along with other thermoplastic material. It should be noted that the use of carbon nanotubes is not restricted to use with the above identified polymers and may be used with other polymers, or other materials including composite materials.

In some embodiments, since low volumes of the CNT materials are used to obtain the desired SR levels, the finished packaging product becomes more transparent as compared to the use of carbon black materials. Current packaging materials formed with carbon black are non-transparent, while packaging materials formed with CNT have light transmittance values of between 60% and 90% depending on the amount of CNT used. Haze found in the packaging materials is in the range of 60% to 70%, and clarity for the packaging materials is in the range of 25% to 45%, during the use of the carbon nanotube material. These values are generally in the range of 0% for carrier tape made with carbon black material as the carbon black material makes the carrier tape black and opaque. Light transmittance, haze and clarity may vary depending on the type of base material used for the carrier tape and its initial base material properties.

In at least one embodiment, a translucent to clear material for the carrier tape formed with carbon nanotubes has advantages of permitting an individual to see an electronic device as disposed into a carrier tape pocket during the loading, transport and pick & place operations of electronic components. Translucent carrier tapes also do not need a pocket hole for in-pocket device verification, reducing the possibility of debris entering into the pocket, where the debris may be formed during pocket hole punching.

In some embodiments, using carbon nanotubes in replacement of carbon black material improves the surface finish of the carrier tape, as surface defects (such as gels/nibs) are reduced. The reduction of nibs is related to use and loading of a lower volume of the CNT material as an additive as compared to the use of carbon black material.

In at least one embodiment, lower percentages of additives used in the formation of carrier tape or anti-static bags, leads to more consistent dispersion of the CNT throughout the packaging material and reduces the buildup of high density entanglements or agglomerations. Agglomerations are clustered particles of nanomaterial permanently drawn together that consist of 10's to 1000's of individual nanoparticles, which if present, significantly increase the size of the original nanoparticles: this scenario will eventually lead to altering the intended properties like conductivity.

In at least one embodiment, poor dispersion of additive material to the base material leads to two significant results: high quantities of undispersed material on the surface that will more readily conduct electro static discharge, and gaps between particles that reduce electro static discharge.

In some embodiments, carrier tapes formed with carbon nanotubes will have less carbon material transfer (sluffing) when compared to carbon black based materials due to the lower content and smaller particle size of the additive. Carbon black will entangle and create relatively large surface areas which are then susceptible to being scraped and transferred (sluffed) onto surfaces of devices or material which are in contact with the carbon black surface area in the carrier tape pocket. Common carbon black doesn't exist as a primary individual particle, instead carbon black consists of a number of particles fused together to form an aggregates with a common size of 50 um to 500 um, while in contrast the CNT materials are in the size range of 1 nm to 100 nm.

In some embodiments, carbon nanotubes have a higher aspect ratio (3000:1 to 6000:1 length/diameter ratio) as compared to carbon black (which have irregular shapes due to agglomeration), so the CNT's have more exposed surface per volume, making the CNT's more effective conductors. The aspect ratio is the ratio of the length to diameter. The higher aspect ratios of CNT's result in a higher surface area percentage compared to carbon black materials. Carbon black also usually has overlapping aggregates, further reducing the effective surface area of the carbon black. The surface area of CNT ranges from 600 $m^2/g$ to 1000 $m^2/g$ compared to 50 $m^2/g$ to 150 $m^2/g$ range for carbon black. Carrier tapes formed with CNT will be more effective conductors as compared to carrier tape formed of carbon black material.

In many embodiments, carbon nanotubes include both single wall and multi-wall carbon nanotubes, which may be utilized as a conductive additive to carrier tape In some embodiments, the manufacture of carrier tape from extruded product/polymers using carbon nanotubes may be accomplished by adding the carbon nanotubes into an extruder in a pelletized version, which uses another polymer as the material for the carrier tape, where the amount of CNT is provided in a range from 0.01% up to 3% by weight for both single wall and multiwall CNT. The carbon nanotubes and polymer carrier may be mixed at various ratios from 0.01% up to 3% with thermoplastic materials such as LLDPE, PET, SAN, ABS, and others as referenced herein or as comparable to the materials referenced herein, dependent on the target surface resistivity desired in the master batch. The target surface resistivity desired in the master batch is based on a final surface resistivity level targeted for the carrier tape. It is also possible to pre-compound the carbon nanotubes into a final resin which may be fed directly into the extruder. This is done by mixing the CNT and the desired thermoplastic resin into an extruder and pelletizing the output.

In at least one embodiment, carrier tape may utilize carbon nanotubes integral with the carrier tape for static dissipative or conductive properties. Carrier tape including the carbon nanotubes may be formed by extruding resins containing CNT's into a sheet form. The sheet form may then be reheated in a thermoforming operation using heating methods such as contact, IR, or convection, and then forming pockets through embossing, air pressure or vacuum forming using forming tools and dies. The sheet form having CNT's may also be extruded and cast directly onto a die and subsequently form the carrier tape incorporating the carbon nanotubes. These processes utilize carbon nanotubes in ranges from 0.015% up to approximately 3%.

In some embodiments, the carbon nanotubes may be added in a raw form during the extrusion processes, or alternatively may be added as a pre-compounded concentrated additive. Alternatively the carbon nanotubes may be compounded with other polymers by a resin supplier for feeding directly into an extruder during a manufacturing process. Following extrusion, the resin including the CNT may be dispersed throughout the carrier tape material, or may be integrated into specific layers as used in a combination of layers within a multi-layered product.

Surface resistivity targets for the carrier tape including the Carbon Nanotubes may generally range from $1\times10^5$ to $1\times10^{12}$ Ω/sq, which is known as the static dissipative range as defined by the ANSI/ESD-S541 National Standard, with levels of the Carbon Nanotubes being adjusted to meet the target values in the final product.

In alternative embodiments static shielding bags utilize carbon nanotubes (CNT) either dispersed throughout the bag as a homogenous material, or by incorporation into one or more individual layers which may be laminated together to create a multi-layer laminated material. The total numbers of layers for a static shielding bag typically range from 3 to 5, with static dissipative layers on the inside and outside and foil layers disposed between or interior to the static dissipative layers.

Carbon nanotubes provide more consistent and repeatable surface resistivity (SR) readings and are less affected by the heating and processing cycles during the creation of a laminated bag material used as a portion of a static shielding bag. Smaller amounts of the CNT's (typically less than 3% CNT's compared to 10-15% for carbon black material) are added to a base material resin for use in the outer layers of the static shielding bag. The base materials typically use polyester or polyethylene, but could be made from other polymers mixed with static dissipative compounds such as carbon nanotubes in order to have static dissipative properties. CNT loaded inner layers may also be used to replace a foil inner layer, making the static shielding bag more transparent or translucent. A translucent to clear material as used in a static shielding bag provides the advantage of enabling visual observation of the contents transported within the interior of the static shielding bag during use, and permitting an individual to read any labels located within the interior of the static shielding bag. In some embodiments, an internal bar code as located within the interior of a static shielding bag using CNT may be observed.

In some embodiments carbon nanotubes provide a higher aspect ratio (3000:1 to 6000:1 Length/Diameter ratio) as compared to carbon black (which has irregular shapes due to agglomeration), therefore the CNT's have more exposed surface per volume, making the material incorporating CNT a more effective conductor. The aspect ratio is the ratio of the length to diameter. The higher aspect ratios of CNT's result in a higher surface area percentage compared to carbon black. Carbon black also usually has overlapping aggregates, which further reduce the effective surface area. The surface area of CNT ranges from 600-1000 $m^2/g$ compared to 50-150 $m^2/g$ for carbon black. Therefore, carrier tapes or layers of material used in static shielding bags formed with CNT will be more effective conductors when compared to carbon black material. Carbon nanotubes include both single wall and multi-wall carbon nanotubes which may be utilized as a conductive component within individual polymer layers laminated together forming the static shielding bags or the carrier tape.

In some embodiments, creating an extruded or blown static shielding bag using CNT's may be accomplished by adding the carbon nanotubes into the extruder in a pelletized form which uses another or different polymer as the carrier. Carbon nanotubes may be mixed at various ratios dependent on the percentage of CNT's in the master batch based on the final surface resistivity level being targeted for the static shielding bags, cover tape or the carrier tape. It is also possible to pre-compound the CNT's into a final resin that can be fed directly into the extruder during the formation of the static shielding bags, cover tape or the carrier tape.

Static Shielding bags may utilize carbon nanotubes within the layers of material forming the bags in order to provide for static dissipative or conductive properties. The carbon nanotubes may be either incorporated into blown film or sheet extrusion, and the blown film or sheet extrusion may be used as the bag material in a homogenous or multi-layer laminate. The carbon nanotubes may also be added during extrusion in its raw form, or as a pre-compounded concentrated additive.

Static shielding bags may be utilized in protecting individually packaged sensitive components, electronic components and devices, or multiples of components or devices in bulk containers, tape and reel, trays or other packaging. The sizes of the static shielding bags may be closely matched to the item(s) being packaged. The static shielding bags may be vacuum sealed for the removal of air prior to heat sealing and transportation of item(s) within the interior of the bag. Alternatively, the static shielding bags may be closed by mechanical or adhesive means. Alternatively, air can also be replaced with inert gases prior to sealing of a static shielding bag in order to reduce any likelihood of corrosion which may occur as a result of condensation during exposure to temperature variations.

In some embodiments the surface resistivity targets for the material using CNT may generally range from $1\times10^5$ to $1\times10^{10}$ Ω/sq, with levels of CNT adjusted to meet the target values of surface resistivity in the final product.

Cover tape may utilize carbon nanotubes for static dissipative or conductive properties of the heat activated adhesive by mixing carbon nanotubes into the adhesive and coating the base film, or use as pre-mixed carrier material mix with the heat activated adhesive prior to coating.

The base film of the cover tape may be formed utilizing carbon nanotubes premixed in a compatible carrier which may be fed in with the base material, or may be compounded with the carbon nanotubes for direct input into the extruder during formation of the base film.

The sealant material of the cover tape may be mixed with carbon nanotubes directly, premixed or by direct compounding.

Surface resistivity targets can generally range from $1\times10^5$ to $1\times10^{10}$ Ω/sq, with levels of CNT adjusted to meet the target values in the final product.

EXAMPLES

Example 1: A carrier tape having a plurality of aligned pockets was formed through the use of:
   Carbon nanotubes having a single wall, each carbon nanotube having a diameter dimension of approximately 20 nm;
   The carbon nanotubes with had a surface area of 750 $m^2/g$;
   The carbon nanotubes had an aspect ratio of 450:1;
   The carbon nanotubes were added as raw material to the base materials prior to extrusion;
   The carbon nanotubes constituted approximately 0.1% of the material by weight for the formed carrier tape:
   The base materials constituted the following percentages of the formed carrier tape by weight:
   Polycarbonate (PC) (99.90%);
   The formed surface resistivity for the carrier tape was $1\times10^{12}$;
   The formed carrier tape had a light transmittance value of 80%;

The formed carrier tape had a haze value of 50.5;
The formed carrier tape had a clarity value of 26; and
The surface defects for the formed carrier tape (such as nibs) were reduced to a value of 0%;
The formed carrier tape had a reduced buildup of high density entanglements or agglomerations measured at a value of 0%; and
The formed carrier tape had less carbon material transfer (sluffing) measured at a value of 0%.

Example 2: A carrier tape having a plurality of aligned pockets was formed through the use of:
Carbon nanotubes having double or multiwall, each of the walls of the carbon nanotubes having wall separation dimension of approximately 0.3 nm;
The diameters for each of the carbon nanotubes was approximately 50 nm;
The carbon nanotubes had a surface area of 600 $m^2/g$;
The carbon nanotubes had an aspect ratio of 3000:1;
The carbon nanotubes were added as a pre-compounded concentrated additive to the base materials prior to extrusion;
The pre-compounded resin with carbon nanotubes constituted approximately 2.5% of the material by weight for the formed carrier tape;
The carbon nanotubes constituted approximately 0.25% of the material by weight for the formed carrier tape;
The base materials constituted the following percentages of the formed carrier tape by weight:
Polycarbonate (PC) (97.5%);
The formed surface resistivity for the carrier tape was $1\times10^8$;
The formed carrier tape had a light transmittance value of 10%;
The surface defects for the formed carrier tape (such as nibs) were reduced to a value of 0%;
The formed carrier tape had a reduced buildup of high density entanglements or agglomerations measured at a value of 0%; and
The formed carrier tape had less carbon material transfer (sluffing) measured at a value of 0%.

Example 3: A carrier tape having a plurality of aligned pockets was formed through the use of:
Carbon nanotubes having a single wall, each carbon nanotube having a diameter dimension of approximately 10 nm;
The carbon nanotubes with had a surface area of 850 $m^2/g$;
The carbon nanotubes had an aspect ratio of 5500:1;
The carbon nanotubes were added as raw material to the base materials prior to extrusion;
The carbon nanotubes constituted approximately 0.2% of the material by weight for the formed carrier tape;
The base materials constituted the following percentages of the formed carrier tape by weight:
Linear Low Density Polyethylene (LLDPE) (19.8%);
Acrylonitrile Butadiene Styrene (ABS) (80%);
The formed surface resistivity for the carrier tape was $1\times10^{10}$;
The formed carrier tape had a light transmittance value of 84%;
The formed carrier tape had a haze value of 59.5;
The formed carrier tape had a clarity value of 26;
The surface defects for the formed carrier tape (such as nibs) were reduced to a value of zero (0);
The formed carrier tape had a reduced buildup of high density entanglements or agglomerations measured at a value of 0%; and
The formed carrier tape had less carbon material transfer (sluffing) measured at a value of 0%.

Example 4: A carrier tape having a plurality of aligned pockets was formed through the use of:
Carbon nanotubes having a single wall, each carbon nanotube having a diameter dimension of approximately 60 nm;
The carbon nanotubes with had a surface area of 750 $m^2/g$;
The carbon nanotubes had an aspect ratio of 6000:1;
The carbon nanotubes were added as raw material to the base materials prior to extrusion;
The carbon nanotubes constituted approximately 0.25% of the material by weight for the formed carrier tape;
The base materials constituted the following percentages of the formed carrier tape by weight:
Linear Low Density Polyethylene (LLDPE) (19.75%);
Styrene-Acrylonitrile (SAN) (80%);
The formed surface resistivity for the carrier tape was $1\times10^{11}$;
The formed carrier tape had a light transmittance value of 81%;
The formed carrier tape had a haze value of 69.5;
The formed carrier tape had a clarity value of 34;
The surface defects for the formed carrier tape (such as nibs) were reduced to a value of zero 0%;
The formed carrier tape had a reduced buildup of high density entanglements or agglomerations measured at a value of 0%; and
The formed carrier tape had less carbon material transfer (sluffing) measured at a value of 0%.

Example 5: A static dissipative carrier bag was formed through the use of:
Carbon nanotubes having a single wall, each carbon nanotube having a diameter dimension of approximately 23 nm;
The carbon nanotubes had an average surface area of 750 $m^2/g$;
The carbon nanotubes had an aspect ratio of 4500:1;
The carbon nanotubes were added as raw materials to the base materials prior to extrusion into sheets;
The carbon nanotubes constituted approximately 0.2% of the material for the formed dissipative bag;
The base materials constituted the following percentages of the formed static dissipative carrier bag:
Linear Low Density Polyethylene (LLDPE) (99.80%);
The formed surface resistivity for the static dissipative carrier bag was $1\times10^{10}$;
The formed static dissipative carrier bag had a light transmittance value of 80;
The formed static dissipative carrier bag had a haze value of 80%;
The formed static dissipative carrier bag had a clarity value of 54;
The surface defects for the formed static dissipative carrier bag (such as nibs) were reduced to a value of 0%;
The formed static dissipative carrier bag had a reduced buildup of high density entanglements or agglomerations measured at a value of 0%; and
The formed static dissipative carrier bag had less carbon material transfer (sluffing) measured at a value of 0%.

Example 6: A static dissipative carrier bag was formed through the use of:
Carbon nanotubes having multi-walls having a wall separation dimension between the walls of approximately 34 nm;

The diameters for each of the carbon nanotubes was approximately 45 nm;
The carbon nanotubes had an average surface area of 1000 m$^2$/g;
The carbon nanotubes had an aspect ratio of 3000:1;
The carbon nanotubes were added as a pre-compounded concentrated additive to the base materials prior to blowing of the static dissipative carrier bag;
The carbon nanotubes constituted approximately 2.0% of the material for the blown static dissipative carrier bag;
The base materials constituted the following percentages of the blown static dissipative carrier bag:
Polyethylene Terephthalate (PET) (48.00%);
Linear Low Density Polyethylene (LLDPE) (50%);
The blown surface resistivity for the static dissipative carrier bag 1×10$^{10}$;
The blown static dissipative carrier bag had a light transmittance value of 60%;
The blown static dissipative carrier bag had a haze value of 60%;
The blown static dissipative carrier bag had a clarity value of 30%;
The surface defects for the blown static dissipative carrier bag (such as nibs) were reduced to a value of 0%;
The blown static dissipative carrier bag had a reduced buildup of high density entanglements or agglomerations measured at a value of 0%; and
The blown static dissipative carrier bag had less carbon material transfer (sluffing) measured at a value of 0%.

Example 7: A static dissipative carrier bag was formed through the use of:
Carbon nanotubes having a single wall having a diameter dimension for the carbon nanotubes of approximately 20 nm;
The carbon nanotubes had an average surface area of 850 m$^2$/g;
The carbon nanotubes had an aspect ratio of 5500;
The carbon nanotubes were added as raw materials to the base materials prior to extrusion into sheets;
The carbon nanotubes constituted approximately 0.3% of the material for the formed antistatic cover tape;
The base materials constituted the following percentages of the formed static dissipative carrier bag;
Biaxial Oriented Polyethylene Terephthalate (BO-PET) (39.85%);
The intermediate material constituted the following percentages of the formed static dissipative carrier bag;
Ethylene-vinyl acetate copolymer (EVA) (40.00%);
The sealant materials constituted the following percentages of the formed static dissipative carrier bag;
Ethylene-vinyl acetate copolymer (EVA)+Polyurethane-based resins (PU)+Polyethylene resins (PE) (39.85%);
The formed surface resistivity for the static dissipative carrier bag was 1×10$^{10}$;
The formed carrier tape had a light transmittance value of 74%;
The formed carrier tape had a haze value of 60.5; and
The formed carrier tape had a clarity value of 20.

Example 8: A static dissipative carrier bag was formed through the use of:
Carbon nanotubes having a single wall having a diameter dimension for the carbon nanotubes of approximately 25 nm;
The carbon nanotubes had an average surface area of 900 m$^2$/g;
The carbon nanotubes had an aspect ratio of 5000:1;
The carbon nanotubes were added as raw materials to the base materials prior to extrusion into sheets;
The carbon nanotubes constituted approximately 0.4% of the material for the formed antistatic cover tape;
The base materials constituted the following percentages of the formed static dissipative carrier bag;
Biaxial Oriented Polyethylene Terephthalate (BO-PET) (39.80%);
The intermediate material constituted the following percentages of the formed static dissipative carrier bag;
Polypropylene (PP) (40.00%);
The sealant materials constituted the following percentages of the formed static dissipative carrier bag;
Polypropylene (PP), +Polyurethane-based resins (PU)+Polyethylene resins (PE) (39.85%);
The formed surface resistivity for the static dissipative carrier bag was 1×10$^9$;
The formed carrier tape had a light transmittance value of 84%;
The formed carrier tape had a haze value of 60.5; and
The formed carrier tape had a clarity value of 20.

In a first alternative embodiment a carrier tape includes a plurality of aligned pockets, the pockets being constructed and arranged for transportation of electronic components, the carrier tape being formed of materials, the materials comprising polymers, the polymers being between 0.99% and 99% by weight of the materials, and carbon nanotubes, the carbon nanotubes being between 0.01% and 3% by weight of the materials.

In a second alternative embodiment according to the first alternative embodiment, the carbon nanotubes are selected from the group consisting of single walled carbon nanotubes, double walled carbon nanotubes, and three or multi-walled carbon nanotubes and combinations thereof.

In a third alternative embodiment according to the second alternative embodiment, the double walled carbon nanotubes and three or multi-walled carbon nanotubes carbon nanotubes have a wall separation distance between adjacent walls of between 0.20 nm and 0.34 nm.

In a fourth alternative embodiment according to the second alternative embodiment, the carbon nanotubes each have a diameter dimension of between 1 nm and 100 nm.

In a fifth alternative embodiment according to the second alternative embodiment, the carbon nanotubes each have a surface area of between 600 m$^2$/g to 1000 m$^2$/g.

In a sixth alternative embodiment according to the second alternative embodiment, the carbon nanotubes have an aspect ratio of 3000:1 to 6000:1.

In a seventh alternative embodiment according to the first alternative embodiment, the carbon nanotubes are added to the polymers as raw carbon nanotube material prior to extrusion of the carrier tape, cover tape or static dissipative bags.

In an eighth alternative embodiment according to the first alternative embodiment, the polymers are selected from the group consisting of polycarbonate (PC), acrylonitrile butadiene styrene (ABS), polypropylene (PP), polystyrene (PS), Polyethylene Terephthalate (PET), High Density Polyethylene (HDPE), Low Density Polyethylene (LDPE), Linear Low Density Polyethylene (LLDPE), Styrene-Acrylonitrile (SAN), Polyethylene (PE), Polyester (PETE) and combinations thereof.

In a ninth alternative embodiment according to the first alternative embodiment, the carrier tape has a static dissipative range measured between 1×10$^5$ and 1×10$^{12}$ Ω/sq.

In a tenth alternative embodiment according to the second alternative embodiment, the carrier tape has a light transmittance values of between 60% and 90%.

In an eleventh alternative embodiment according to the tenth alternative embodiment, the carrier tape has a haze value of between 60% and 70%.

In a twelfth alternative embodiment according to the eleventh alternative embodiment, the carrier tape has a clarity value of between 25% and 45%.

In a thirteenth alternative embodiment according to the second alternative embodiment, the carrier tape has surface defects measured at a value of 10% or less.

In a fourteenth alternative embodiment according to the second alternative embodiment, the carrier tape has high density entanglements measured at a value of 5% or less.

In a fifteenth alternative embodiment according to the second alternative embodiment, the carrier tape has agglomerations measured at a value of 5% or less.

In a sixteenth alternative embodiment according to the second alternative embodiment, the carrier tape has carbon material transfer (sluffing) measured at a value of 1% or less.

In a seventeenth alternative embodiment according to the first alternative embodiment, the carrier tape further includes a cover tape, the cover tape having heat activated adhesive or pressure sensitive adhesive, the cover tape having at least one layer, the at least one layer being formed of the polymers and carbon nanotubes.

In an eighteenth alternative embodiment a cover tape is formed of an elongate tape portion, said elongate tape portion being formed of materials, said materials comprising polymers, said polymers being between 0.99% and 99% by weight of said materials, and carbon nanotubes said carbon nanotubes being between 0.01% and 3% by weight of said materials, wherein said elongate tape portion is constructed and arranged for engagement to a carrier tape through heat activation or pressure activation.

In a nineteenth alternative embodiment an anti-static bag is formed of a plurality of layers, said plurality of layers being engaged to each other in a stacking relationship, said anti-static bag being constructed and arranged for transportation of electronic components, at least one of said plurality of layers being formed of materials, said materials comprising polymers, said polymers being between 0.99% and 99% by weight of said materials, and carbon nanotubes said carbon nanotubes being between 0.01% and 3% by weight of said materials.

United States Patent Publication US20080085405A1 is incorporated by reference herein in its entirety. The below identified publications are also incorporated by reference herein in their entireties.

Efficient coating of transparent and conductive carbon nanotube thin films on plastic substrates M H Andrew Ng, Lysia T Hartadi, Huiwen Tan and C H Patrick Poa, Published 15 Apr. 2008 •IOP Publishing Ltd, *Nanotechnology*, Volume 19, Number 20.

This completes the description of the preferred and alternate embodiments of the invention. Those skilled in the art may recognize other equivalents to the specific embodiment described herein which equivalents are intended to be encompassed by the claims attached hereto.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

These and other embodiments which characterize the invention are pointed out with particularity in the claims annexed hereto and forming a part hereof. However, for further understanding of the invention, its advantages and objectives obtained by its use, reference should be made to the drawings which form a further part hereof and the accompanying descriptive matter, in which there is illustrated and described embodiments of the invention.

We claim:

1. An electronics transportation device comprising:
a carrier tape having a plurality of aligned pockets, said pockets being constructed and arranged for transportation of electronic components, said carrier tape being formed of materials, said materials comprising polymers, said polymers being between 0.99% and 99% by weight of said materials, and carbon nanotubes said carbon nanotubes being between 0.01% and 3% by weight of said materials and wherein said carbon nanotubes have an aspect ratio of 3000:1 to 6000:1, further wherein said carbon nanotubes are selected from the group consisting of double walled carbon nanotubes, three walled nanotubes, multi-walled carbon nanotubes, and combinations thereof, wherein said carbon nanotubes have a wall separation distance between adjacent walls of between 0.20 nm and 0.34 nm and wherein said polymers are selected from the group consisting of polycarbonate (PC), acrylonitrile butadiene styrene (ABS), polystyrene (PS), Styrene-Acrylonitrile (SAN), and combinations thereof.

2. The electronics transportation device according to claim 1, wherein said carbon nanotubes each have a diameter dimension of between 1 nm and 100 nm.

3. The electronics transportation device according to claim 1, wherein said carbon nanotubes each have a surface area of between 600 $m^2$/g to 1000 $m^2$/g.

4. The electronics transportation device according to claim 1, wherein said carbon nanotubes are added to said polymers as raw carbon nanotube material prior to extrusion of said carrier tape.

5. The electronics transportation device according to claim 1, wherein said carrier tape has a static dissipative range measured between $1 \times 10^5$ and $1 \times 10^{12}$ Ω/sq.

6. The electronics transportation device according to claim 1, wherein said carrier tape has a light transmittance value of between 60% and 90%.

7. The electronics transportation device according to claim 6, wherein said carrier tape has a haze value of between 60% and 70%.

8. The electronics transportation device according to claim 7, wherein said carrier tape has a clarity value of between 25% and 45%.

9. The electronics transportation device according to claim 1, wherein said carrier tape has surface defects measured at a value of 10% or less.

10. The electronics transportation device according to claim 1, wherein said carrier tape has high density entanglements measured at a value of 5% or less.

11. The electronics transportation device according to claim 1, wherein said carrier tape has agglomerations measured at a value of 5% or less.

12. The electronics transportation device according to claim 1, wherein said carrier tape has carbon material transfer measured at a value of 1% or less.

13. The electronics transportation device according to claim 1, said carrier tape further comprising a cover tape, said cover tape comprising heat activated adhesive or pressure sensitive adhesive, said cover tape comprising at least one layer, said at least one layer being formed of said polymers and said carbon nanotubes.

14. An electronics transportation device comprising:
  an anti-static bag having a plurality of layers, said plurality of layers being engaged to each other in a stacking relationship, said anti-static bag being constructed and arranged for transportation of electronic components, at least one of said plurality of layers being formed of materials, said materials comprising polymers, said polymers being between 0.99% and 99% by weight of said materials, and carbon nanotubes said carbon nanotubes being between 0.01% and 3% by weight of said materials and wherein said carbon nanotubes have an aspect ratio of 3000:1 to 6000:1, further wherein said carbon nanotubes are selected from the group consisting of double walled carbon nanotubes, three walled nanotubes, multi-walled carbon nanotubes, and combinations thereof, wherein said carbon nanotubes and three or have a wall separation distance between adjacent walls of between 0.20 nm and 0.34 nm and wherein said polymers are selected from the group consisting of polycarbonate (PC), acrylonitrile butadiene styrene (ABS), polystyrene (PS), and Styrene-Acrylonitrile (SAN), and combinations thereof.

* * * * *